United States Patent
Bang et al.

(10) Patent No.: US 9,331,537 B2
(45) Date of Patent: May 3, 2016

(54) MOTOR AND WASHING MACHINE HAVING THE SAME

(71) Applicant: SAMSUNG ELECTRONICS CO., LTD., Suwon-si, Gyeonggi-do (KR)

(72) Inventors: Myung Bae Bang, Pyeongtaek-si (KR); Byung Ryel In, Yongin-si (KR); Woong Hwang, Suwon-si (KR); Su Kwon Jeong, Suwon-si (KR); Jae Woong Jung, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 239 days.

(21) Appl. No.: 14/023,979

(22) Filed: Sep. 11, 2013

(65) Prior Publication Data
US 2014/0070657 A1    Mar. 13, 2014

(30) Foreign Application Priority Data
Sep. 12, 2012   (KR) .................. 10-2012-0101260

(51) Int. Cl.
*H02K 3/34*   (2006.01)
*H02K 15/10*  (2006.01)

(52) U.S. Cl.
CPC .................. *H02K 3/34* (2013.01); *H02K 3/345* (2013.01); *H02K 15/10* (2013.01)

(58) Field of Classification Search
CPC .......... H02K 15/10; H02K 3/345; H02K 3/34
See application file for complete search history.

(56) References Cited

U.S. PATENT DOCUMENTS

| | | | |
|---|---|---|---|
| 6,900,572 B2 * | 5/2005 | Omura ......................... 310/215 |
| 6,992,417 B1 * | 1/2006 | Yamada ................. H02K 3/522 310/194 |
| 7,138,741 B2 * | 11/2006 | Lee ........................ 310/216.091 |
| 7,489,061 B2 * | 2/2009 | Nishimura .................... 310/215 |
| 7,649,295 B2 * | 1/2010 | Fukui et al. ................... 310/215 |
| 7,750,531 B2 * | 7/2010 | Kim .............................. 310/268 |
| 8,013,490 B2 * | 9/2011 | Hino et al. ..................... 310/194 |

* cited by examiner

*Primary Examiner* — Dang Le
(74) *Attorney, Agent, or Firm* — Staas & Halsey LLP (57) ABSTRACT

A washing machine with a motor having a structure with improved performance. The washing machine includes a body, a tub disposed in the body, a drum rotatably disposed in the tub, and a motor including a stator coupled to a rear surface of the tub and a rotor rotatably disposed inside the stator. The stator includes a stator core including a core body and a plurality of core teeth extending inward from an inner circumferential surface of the core body in a radial direction of the core body, a first insulator and a second insulator covering both ends of the core body and the core teeth, a coil wound around the core teeth, and a plurality of insulation films disposed between the first insulator and the second insulator to electrically insulate the stator core and the coil.

15 Claims, 12 Drawing Sheets

MOTOR AND WASHING MACHINE HAVING THE SAME

CROSS-REFERENCE TO RELATED APPLICATIONS

This application claims the benefit of Korean Patent Application No. 10-2012-0101260, filed on Sep. 12, 2012 in the Korean Intellectual Property Office, the disclosure of which is incorporated herein by reference.

BACKGROUND

1. Field

Embodiments of the present disclosure relate to a motor to generate rotating force and a washing machine having the same.

2. Description of the Related Art

A washing machine, which washes clothes using electricity, generally includes a tub to retain wash water, a drum rotatably installed in the tub and a motor to rotate the drum.

The motor, which produces rotating power from electric energy, is provided with a stator and a rotor. The rotor is configured to electromagnetically interact with the stator, and is rotated by force acting between a magnetic field and current flowing through a coil.

The stator generally includes a stator core, a coil wound around the stator core to generate magnetic flux, and an insulator to electrically insulate the stator core and the coil.

When current is supplied to the coil, magnetic flux is formed at the stator core according to the principle of an electromagnet, and the intensity of magnetic flux is proportional to the amount of current supplied to the coil. The amount of current supplied to the coil is increased by increasing the winding area or winding diameter of the coil. To obtain high output power of magnetic flux of the stator without increasing the size of the stator, a stator structure which allows increase in the winding area or diameter of the coil is desired.

SUMMARY

Therefore, it is an aspect of the present disclosure to provide a motor having a structure with improved performance and a washing machine having the same.

It is another aspect of the present disclosure to provide a motor having an improved fixing structure and a washing machine having the same.

Additional aspects of the disclosure will be set forth in part in the description which follows and, in part, will be apparent from the description, or may be learned by practice of the disclosure.

In accordance with one aspect of the present disclosure, a washing machine includes a body, a tub disposed in the body, a drum rotatably disposed in the tub, and a motor including a stator coupled to a rear surface of the tub and a rotor rotatably disposed inside the stator, wherein the stator includes a stator core including a core body and a plurality of core teeth extending inward from an inner circumferential surface of the core body in a radial direction of the core body, a first insulator and a second insulator covering both ends of the core body and the core teeth, a coil wound around the core teeth, and a plurality of insulation films disposed between the first insulator and the second insulator to electrically insulate the stator core and the coil.

The first insulator may include a first insulator body covering one end of the core body, and a plurality of first insulator teeth covering one end of each of the core teeth, wherein each of the insulation films is inserted between neighboring ones of the first insulator teeth.

The first insulator may include a first seating rib protruding outward from an outer surface of each of the first insulator teeth to allow a corresponding one of the insulation films to be seated.

The first insulator may further include at least one separation prevention protrusion protruding from the first seating rib toward the second insulator to prevent the corresponding one of the insulation films from being separated from the first seating rib.

The first insulator may further include a second seating rib protruding inward from an inner circumferential surface of the first insulator body positioned between neighboring ones of the first insulator teeth in a radial direction of the first insulator body, and connected to the first seating rib.

A length of the insulation films in an axial direction of the stator is longer than a length of the stator core.

The first insulator may include at least one connection rib protruding from one end thereof facing the second insulator and connected to the second insulator, and the second insulator may further include at least one fixing rib disposed at a position corresponding to a position of the connection rib and protruding from one end thereof facing the tub to contact the tub.

The first insulator may include a first through hole formed through the connection rib, and the second insulator may include a second through hole formed through the fixing rib and disposed concentric with the first through hole.

The second insulator may further include at least one fixing pin protruding from the fixing rib toward the rear surface of the tub.

The washing machine may include a bearing housing inserted into the rear surface of the tub, wherein the tub includes a first accommodation hole to accommodate the fixing pin inserted thereinto, wherein the bearing housing includes a second accommodation hole to communicate with the second through hole when the fixing pin inserted into and accommodated in the first accommodation hole.

The washing machine may include a bearing housing inserted into the rear surface of the tub, wherein the bearing housing may include a first accommodation hole to accommodate the fixing pin inserted thereinto, and a second accommodation hole to communicate with the second through hole when the fixing pin inserted into and accommodated in the first accommodation hole.

In accordance with another aspect of the present disclosure, a motor includes a stator and a rotor rotatably disposed inside the stator, wherein the stator includes a stator core including a core body and a plurality of core teeth extending inward from an inner circumferential surface of the core body in a radial direction of the core body, an insulator including an insulator body covering both ends of the core body, and a plurality of insulator teeth covering both ends of the core teeth, and a plurality of insulation films, each being inserted between neighboring ones of the insulator teeth, wherein the insulator includes a plurality of separation prevention ribs formed on outer surfaces of the insulator teeth in a stepped manner to prevent the insulation films from being separated from the insulator.

The insulator may include at least one separation prevention protrusion protruding from the separation prevention rib to an inside of the insulator to prevent each of the insulation films from being separated from the insulator and moved to a space between neighboring ones of the insulator teeth.

Each of the insulator teeth may include an extension portion extending from an inner circumferential surface of the insulator body toward a center of the insulator body, and a width widening portion provided at one end of the extension portion.

The extension portion is disposed between the separation prevention protrusions.

The width widening portion may include at least one film guide surface to guide one end of each of the insulation films to be bent toward an inside thereof.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout. Hereinafter, a description will be given of a washing machine with a motor, which is applicable to all kinds of apparatuses including an air conditioner, an electric vehicle, a light rail transit, an electric bicycle and a small generator that employ a motor as a power source. Hereinafter, a washing machine will be described as an example of application of the motor.

Figure 1:
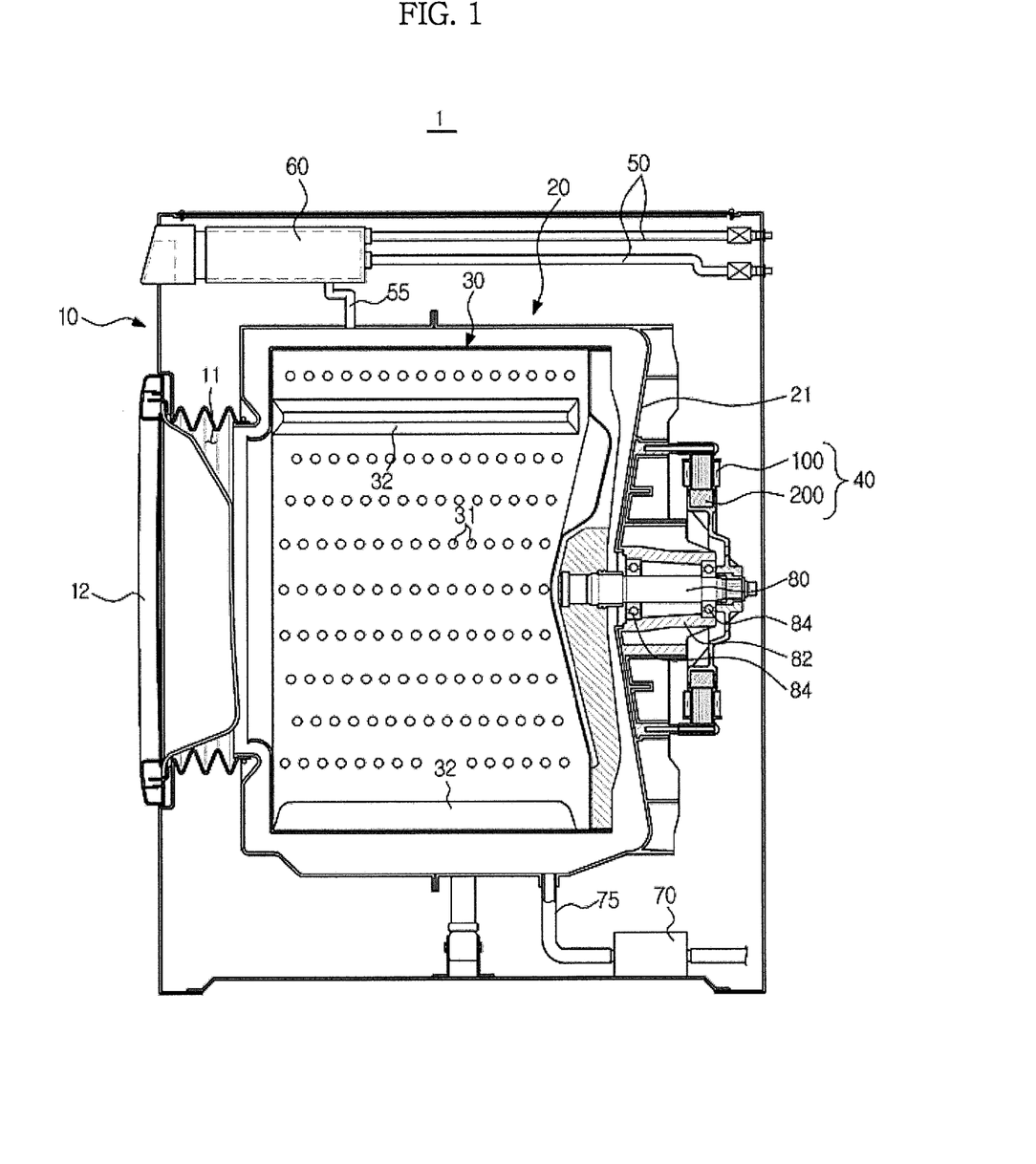
FIG. 1 is a view illustrating a washing machine according to an exemplary embodiment of the present disclosure.

FIG. 1 is a view illustrating a washing machine according to an exemplary embodiment of the present disclosure.

As shown in FIG. 1, the washing machine 1 includes a cabinet 10 forming the outward appearance of the washing machine 1, a tub 20 disposed within the cabinet 10, a drum 30 rotatably disposed in the tub 20, and a motor 40 to rotate the drum 30.

The front portion of the cabinet 10 is provided with an inlet 11 through which laundry may be inserted into the drum 30. The inlet 11 is opened and closed by a door 12 installed at the front of the cabinet 10.

A water supply pipe 50 to supply wash water to the tub 20 is installed at an upper portion of the tub 20. One side of the water supply pipe 50 is connected to an external water supply source (not shown), and the other side of the water supply pipe 50 is connected to a detergent supply unit 60. The detergent supply unit 60 is connected to the tub 20 through a connection pipe 55. Water flowing into the water supply pipe 50 is supplied to the tub 20 along with a detergent via the detergent supply unit 60.

Installed at the bottom of the tub 20 are a drain pump 70 and drain pipe 75 to discharge water in the tub 20 from the cabinet 10.

A plurality of through holes 31 is formed around the drum 30 to allow flow of wash water therethrough, and a plurality of lifters 32 is installed on the inner circumferential surface of the drum 30 to allow the laundry to tumble during rotation of the drum 30.

The drum 30 and motor 40 are connected to each other through a drive shaft 80. The drive shaft 80 transmits the rotating power of the motor 40 to the drum 30. One end of the drive shaft 80 is connected to the drum 30, and the other end of the drive shaft 80 extends to the outside of the rear wall 21 of the tub 20.

Installed at the rear wall 21 of the tub 20 is a bearing housing 82 by which the drive shaft 80 is rotatably supported. The bearing housing 82 may be formed of an aluminum alloy, and may be inserted into the rear wall 21 of the tub 20 when the tub 20 is manufactured through injection molding. Bearings 84 are installed between the bearing housing 82 and the drive shaft 80 to allow smooth rotation of the drive shaft 80.

Figure 2:
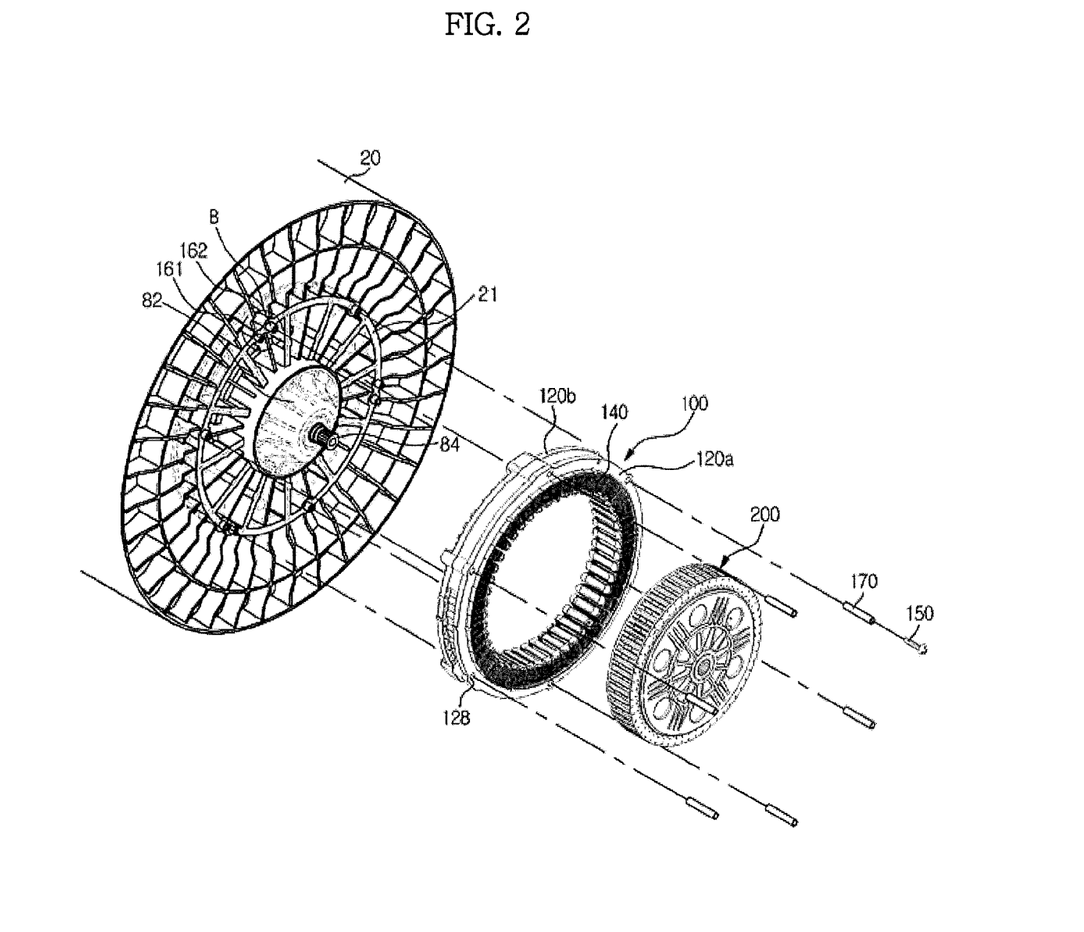
FIG. 2 is a view illustrating a tub and a stator and rotor of a motor of the washing machine according to the exemplary embodiment of the present disclosure, in which the tub, stator and rotor are separated from each other.
Figure 3:
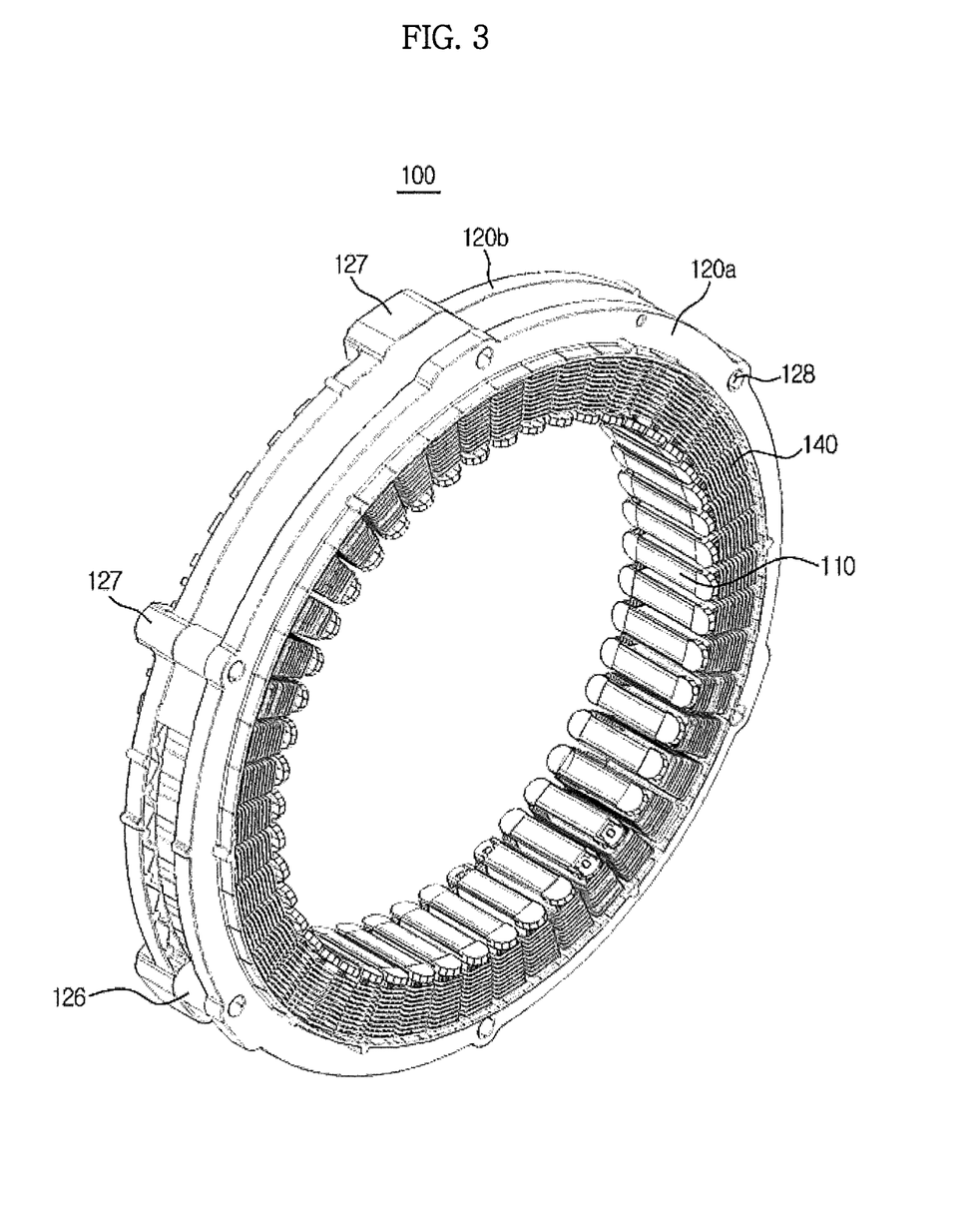
FIG. 3 is a perspective view of the stator of FIG. 2.
Figure 4:
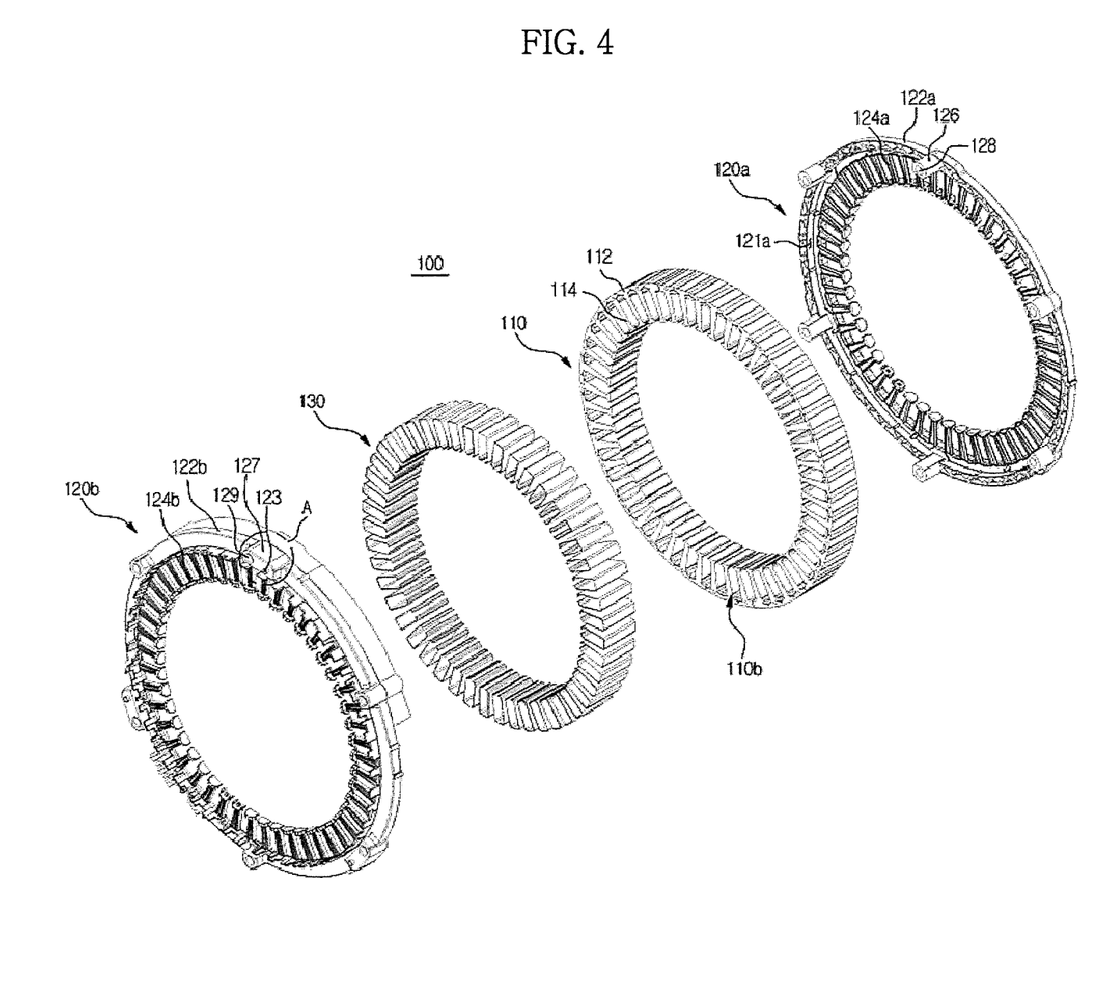
FIG. 4 is an exploded perspective view illustrating constituents of the stator of FIG. 3, which are separated from each other.
Figure 5:
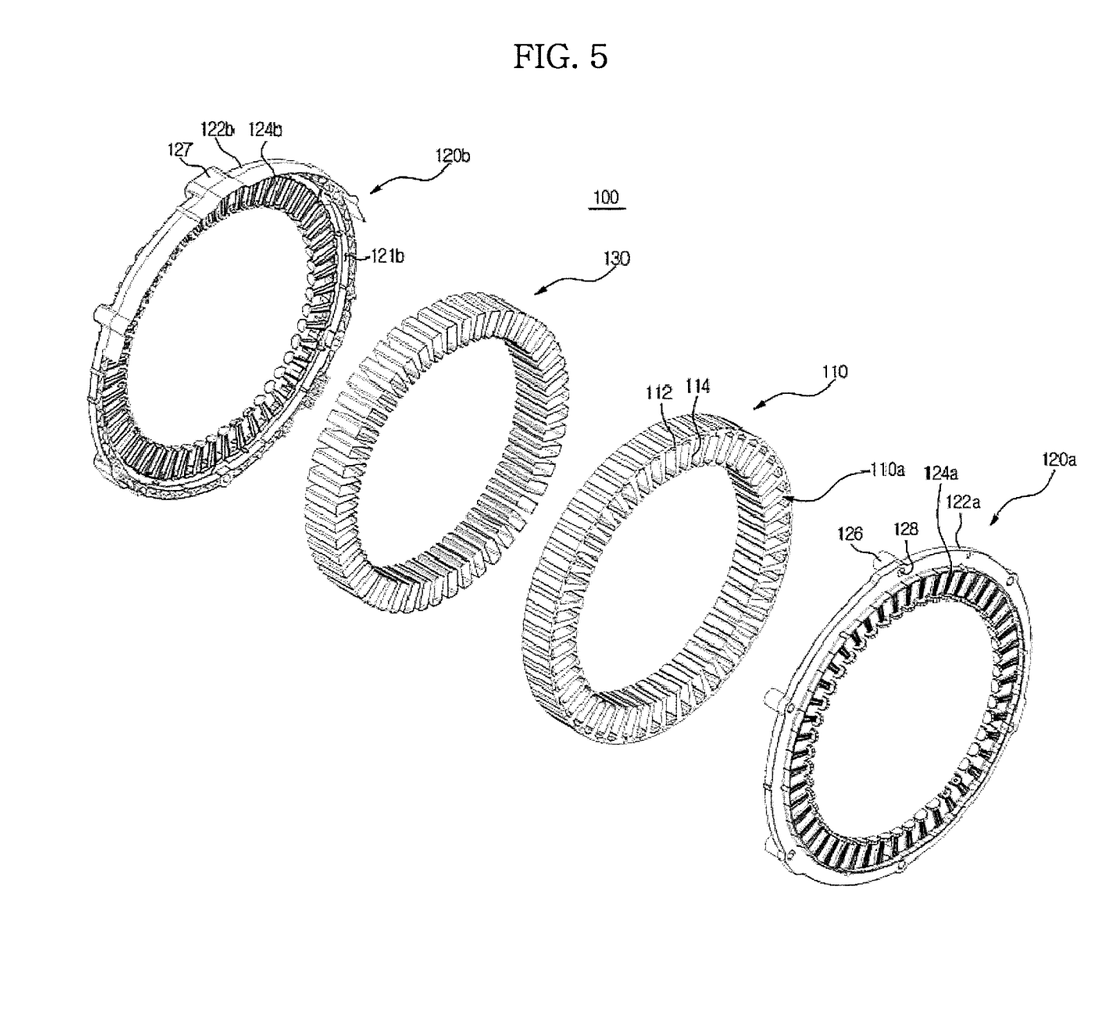
FIG. 5 is an exploded perspective view of FIG. 4 taken at a different angle.
Figure 6:
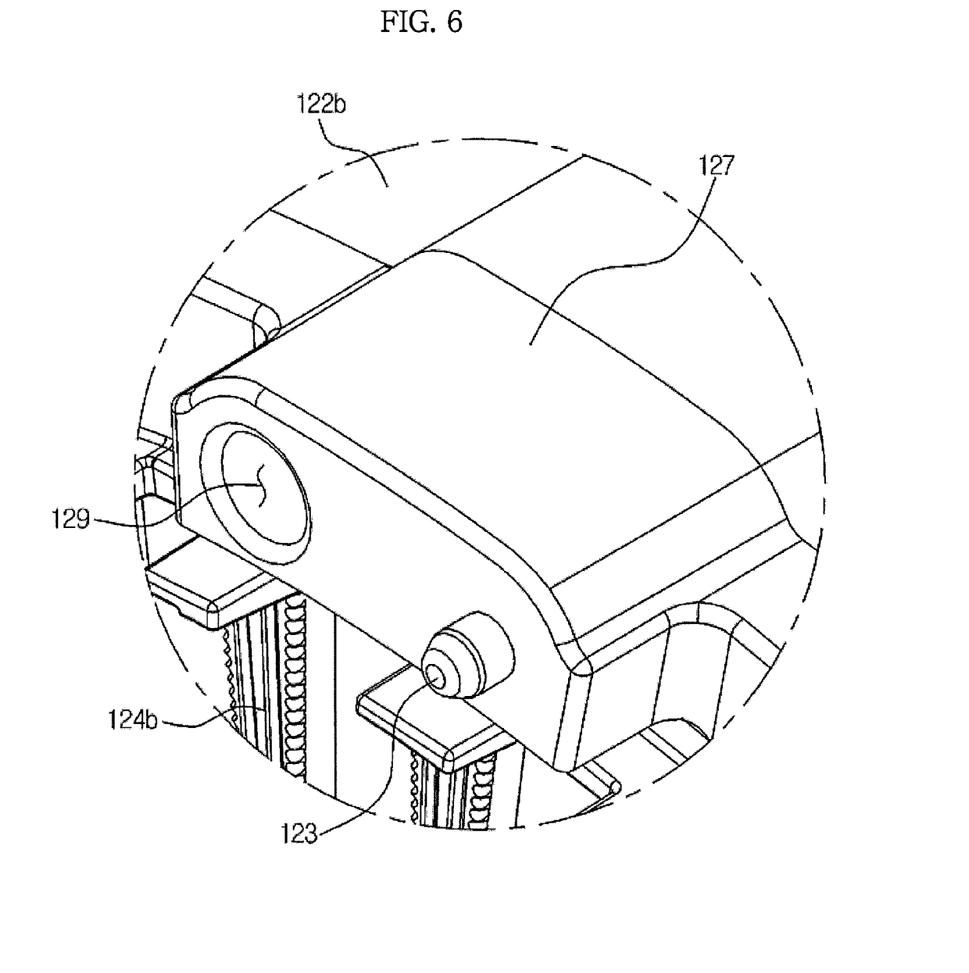
FIG. 6 is an enlarged view of section 'A' of FIG. 4.
Figure 7:
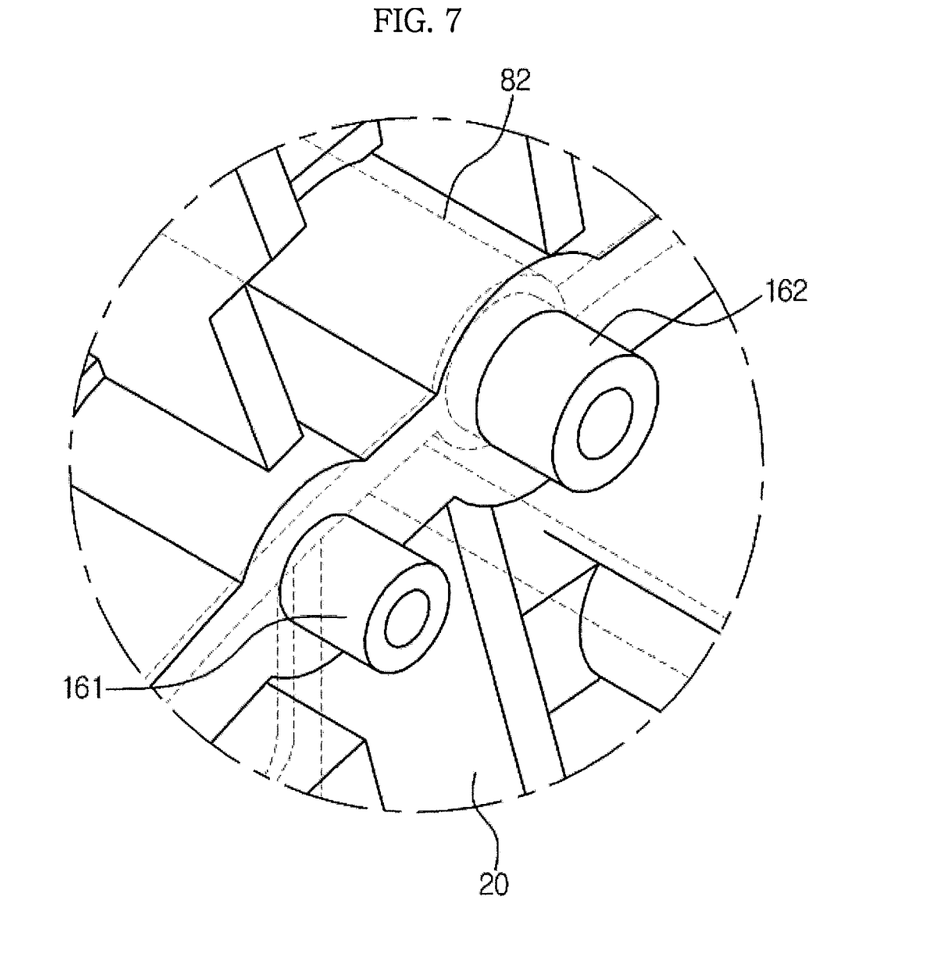
FIG. 7 is an enlarged view of section 'B' of FIG. 2.

FIG. 2 is a view illustrating a tub and a stator and rotor of a motor of the washing machine according to the exemplary embodiment of the present disclosure, in which the tub, stator and rotor are separated from each other, and FIG. 3 is a perspective view of the stator of FIG. 2. FIG. 4 is an exploded perspective view illustrating constituents of the stator of FIG. 3, which are separated from each other, and FIG. 5 is an exploded perspective view of FIG. 4 taken at a different angle. FIG. 6 is an enlarged view of section 'A' of FIG. 4, and FIG. 7 is an enlarged view of section 'B' of FIG. 2. The coil is shown in FIGS. 4 and 5.

As shown in FIGS. 1 to 7, the motor 40 is coupled to the outside of the tub 20 to drive the drum 30 to rotate in opposite directions. The motor 40 includes a stator 100 mounted to the rear wall 20 of the tub 20, and a rotor 200 disposed around the stator 100 to rotate by electromagnetically interacting with the stator 100.

The stator 100 includes a stator core 110 formed of a metal material, a first insulator 120a and a second insulator 120b covering both ends 110a and 110b of the stator core 110, an insulation film 130 inserted between the first insulator 120a and the second insulator 120b, a coil 140 wound around the first insulator 120a, second insulator 120b and insulation film 130. The stator core 110 may be formed by stacking metal plates processed through press working. The first insulator 120a, second insulator 120b and insulation film 130 may be formed of materials having a property of electrical insulation.

The stator core 110 includes a ring-shaped core body 112, and a plurality of core teeth 114 extending inward from the inner circumferential surface of the core body 112 in the radial direction of the core body 112 and arranged spaced apart from each other along the inner circumferential surface of the core body 112.

The first insulator 120a includes a first insulator body 122a having a shape corresponding to that of the core body 112, and a plurality of first insulator teeth 124a having a shape corresponding that of the core teeth 114. The first insulator teeth 124a extend inward in the radial direction of the first insulator body 122a and are arranged spaced apart from each other along the inner circumferential surface of the first insulator body 122a.

The first insulator 120a further includes a plurality of connection ribs 126 connected to the second insulator 120b, and first through holes 128 stator 100 to fix the tub 20 to the rear wall 21 therethrough. The connection ribs 126 protrude from the first insulator body 122a toward the second insulator 120b, and are arranged spaced a predetermined distance apart from each other in the circumferential direction of the first insulator body 122a and adapted to be connected to the second insulator 120b when the stator core 110, first insulator 120a and second insulator 120b are coupled to each other. The first through holes 128 are formed through the first insulator body 122a and the connection rib 126. Sleeves 170 may be inserted into the first through holes 128 to reinforce fastening of the stator 100 to the tub 20.

The length of the connection rib 126 protruding from the first insulator 120a may vary depending on the stack height of the stator core 110. That is, if the stack of the stator core 110 is high, the connection rib 126 may be formed to have a long protruding length. If the stack of stator core 110 is short, the connection rib 126 may be formed to have a short protruding length. In case that the connection ribs 126 and the first insulator 120a are integrally formed through injection molding, a mold for injection molding of the first insulator 120a does not need to be separately fabricated whenever the length of the connection ribs 126 changes according to change in the stack height of the stator core 110, but one mold may be used in common. The length of the connection ribs 126 may be adjusted during fabrication of the first insulator 120a through injection molding by filling a portion of the mold for formation of the connection ribs 126, which is pre-formed to have a deep depth, to the height corresponding to the protruding length of the connection ribs 126, using a tool such as a jig.

The second insulator 120b includes a second insulator body 122b having a shape corresponding to that of the core body 112, and a plurality of second insulator teeth 124b having a shape corresponding to that of the core teeth 114. The second insulator teeth 124b extend inward in the radial direction of the second insulator body 122b and are arranged spaced apart from each other along the inner circumferential surface of the second insulator body 122b.

The second insulator 120b further includes a plurality of fixing ribs 127 connected to the tub 20, second through holes 129 formed through the second insulator body 122b and the fixing rib 127, and a plurality of fixing pins 123 protruding from surfaces of the fixing ribs 127 facing the rear wall 21 of the tub 20 toward the rear wall 21 of the tub 20. The fixing ribs 127 protrude from the second insulator body 122b toward the rear wall 21 of the tub 20, and are arranged spaced a predetermined distance apart from each other in the circumferential direction of the second insulator body 122b. The fixing ribs 127 contact the rear wall 21 of the tub 20 when the stator 110 is coupled to the tub 20. The fixing pins 123 is adapted to determine the position of the stator 100 before being inserted into the rear wall 21 of the tub 20 to fix the stator 100 to the rear wall 21 of the tub 20. The second through holes 129 are formed through the second insulator body 122b and the fixing ribs 127, and are disposed to be concentric with the first through holes 128. Sleeves 170 may be inserted into the second through holes 129 to reinforce fastening of the stator 100 to the tub 20.

First accommodation holes 161 to accommodate the fixing pins 123 inserted thereinto are provided at the rear wall 21 of the tub 20 to which the stator 100 is mounted. The bearing housing 82 inserted into the rear wall 21 of the tub 20 is provided with a second accommodation holes 162 to accommodate fixing members 150 inserted thereinto. At least two first accommodation holes 161 and at least two second accommodation holes 162 are arranged spaced apart from each other in the circumferential direction of the tub 20.

The first accommodation holes 161 allow the position of the stator 100 to be determined before the fixing pins 142 are accommodated therein to fix the stator 100 to the rear wall 21 of the tub 20, while the second accommodation holes 162 accommodate the fixing members 150 penetrating the sleeves 170, thereby allowing the stator 100 to be fixed to the rear wall 21 of the tub 20.

The bearing housing 82 is inserted into the rear wall 21 of the tub 20 to reinforce the tub 20, and directly coupled to the stator 100 through the second accommodation holes 162 to allow the stator 100 to be stably fixed to the rear wall 21 of the tub 20.

Although not shown in FIGS. 1 to 7, first accommodation holes 161 and the second accommodation holes 162 may all be provided in the bearing housing 82.

The insulation film 130 is inserted between the first insulator 120a and the second insulator 120b.

The insulation film 130 is formed approximately in a bracket shape, and disposed between one of the first insulator teeth 124a and one of the second insulator teeth 124b neighboring each other to electrically insulate the stator core 110 and the coil 140. The insulation film 130 may be formed of paper or plastics that are electrically nonconductive.

The coil 140 is wound around the first insulator 120a, second insulator 120b and insulation film 130. When 3-phase alternating current (AC) power is supplied to the coil 140, magnetic flux is created at the stator core 110. The magnetic flux created at the stator core 110 interacts with the magnetic flux created at the rotor 200 to rotate the rotor 200.

Figure 8:
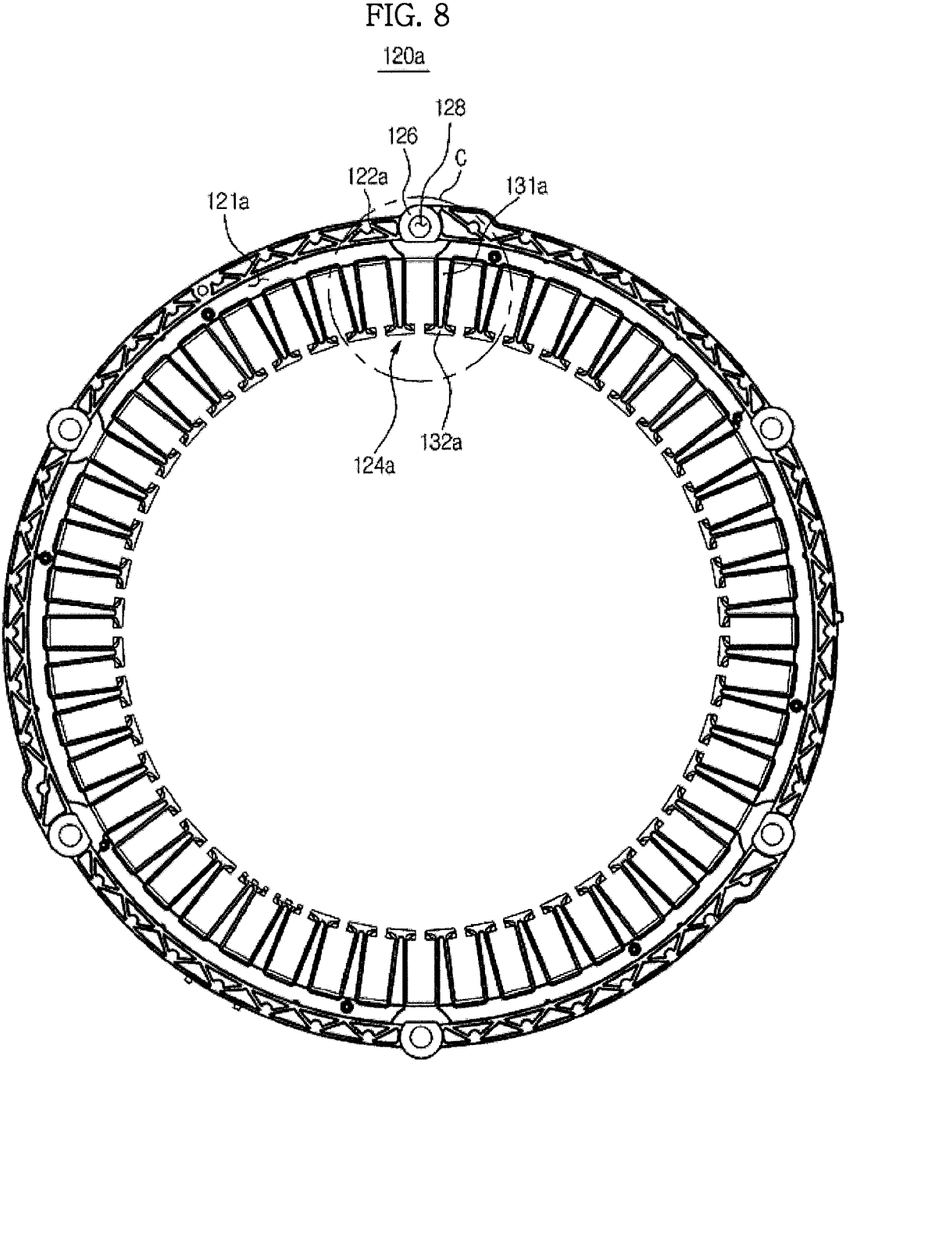
FIG. 8 is a plan view illustrating the inside of a first insulator.
Figure 9:
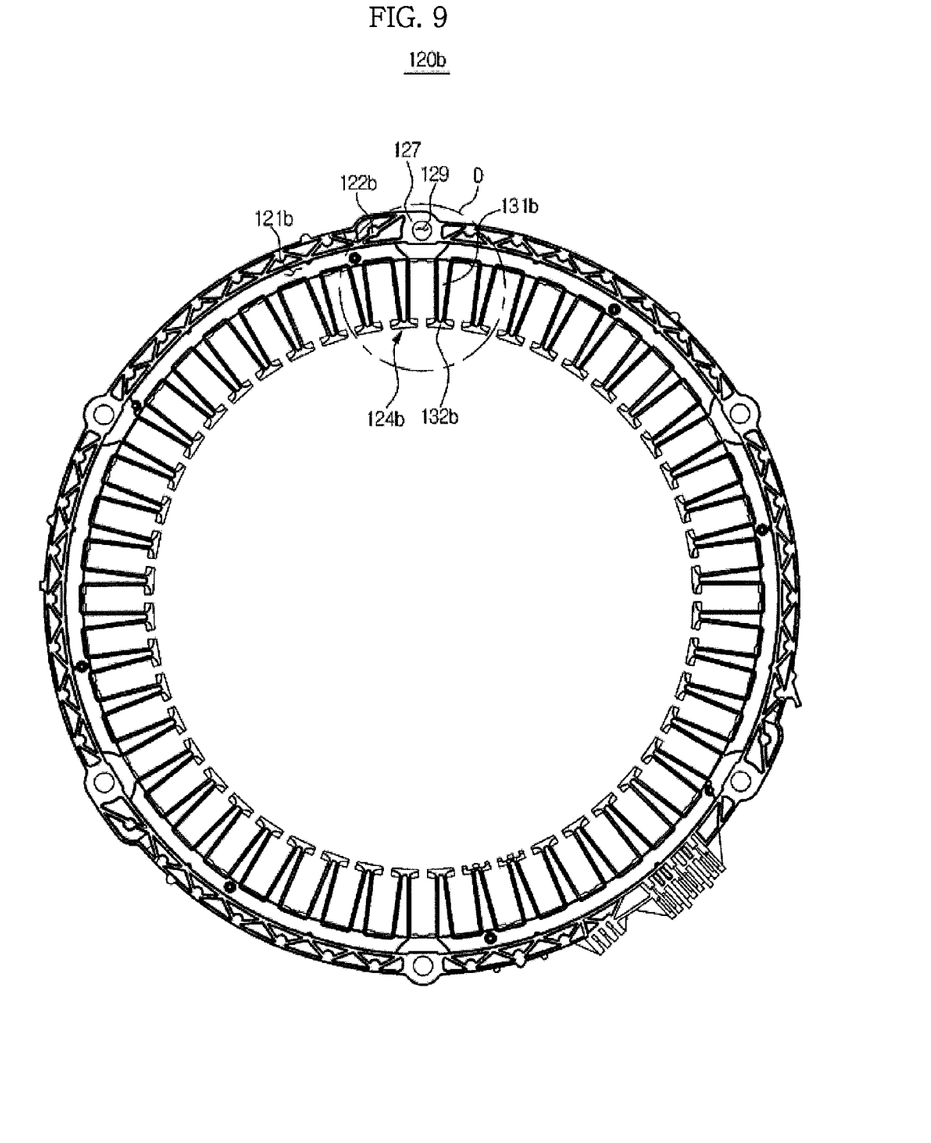
FIG. 9 is a plan view illustrating the inside of a second insulator.
Figure 10:
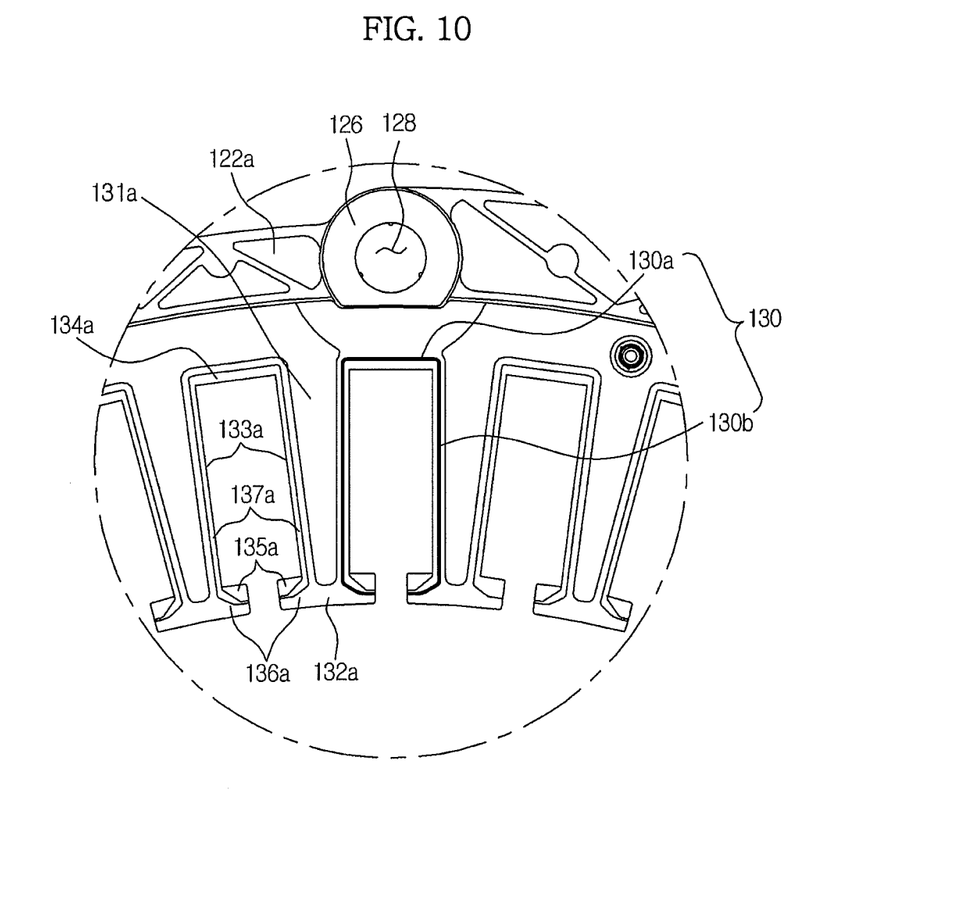
FIG. 10 is an enlarged view of section 'C' of FIG. 8.
Figure 11:
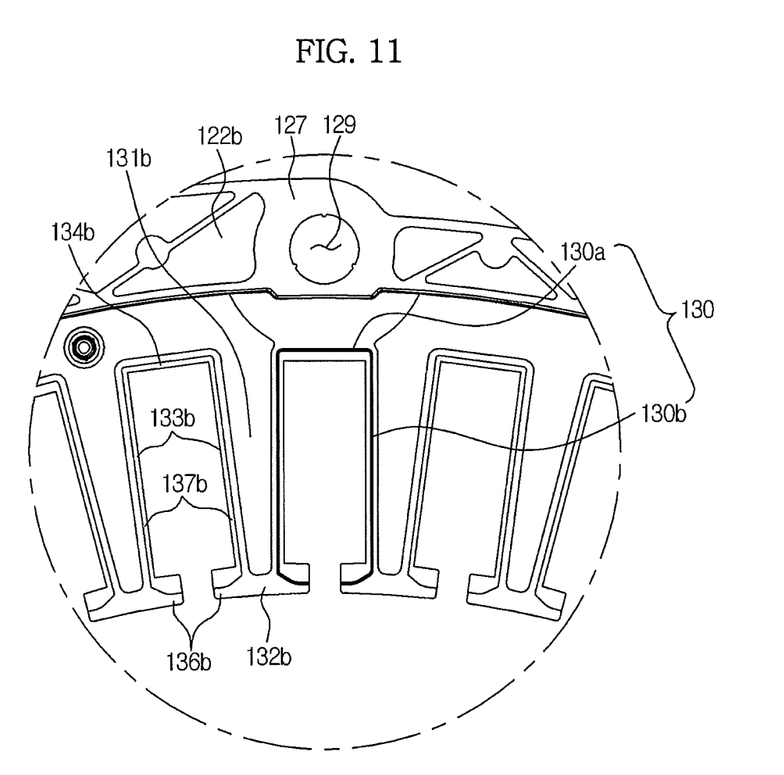
FIG. 11 is an enlarged view of section 'D' of FIG. 9.
Figure 12:
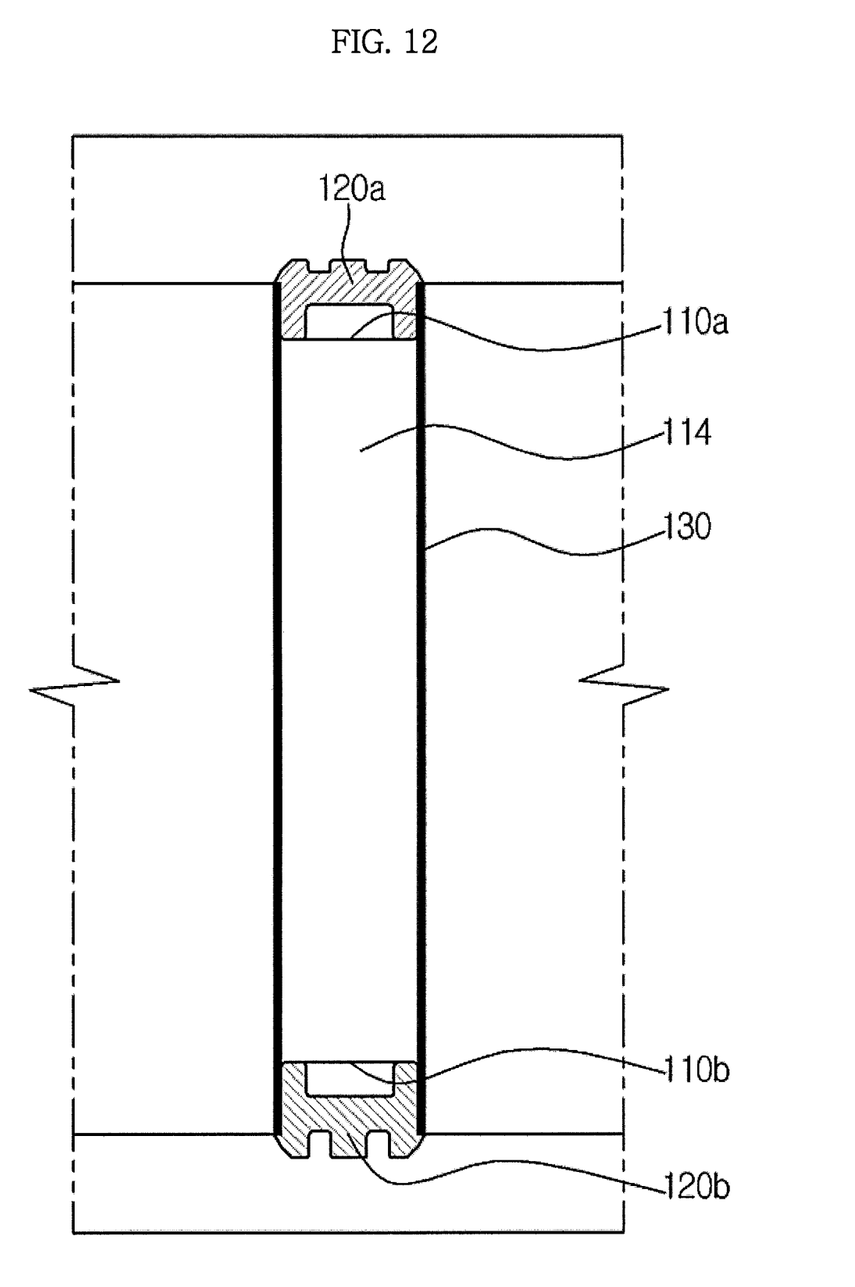
FIG. 12 is a cross-sectional view illustrating core teeth, insulator teeth and insulation film.

FIG. 8 is a plan view illustrating the inside of a first insulator, and FIG. 9 is a plan view illustrating the inside of a second insulator. FIG. 10 is an enlarged view of section 'C' of FIG. 8, and FIG. 11 is an enlarged view of section 'D' of FIG. 9. FIG. 12 is a cross-sectional view illustrating core teeth, insulator teeth and insulation film.

As shown in FIGS. 4, 5 and FIGS. 8 to 12, the first insulator 120a includes a first core accommodation portion 121a to accommodate one end 110a of the stator core 110. The first core accommodation portion 121a is formed in a shape corresponding to the external shape of the stator core 110 to accommodate the stator core 110.

Each of the first insulator teeth 124a includes an extension portion 131a extending from the inner circumferential surface of the first insulator body 122a toward the center of the first insulator body 122a, and a width widening portion 132a provided at one end of the extension portion 131a. The coil 140 is wound around the extension portion 131a. The width widening portion 132a includes at least one guide surface 136a to guide the insulation film 130 such that the end portion of the insulation film 130 is bent approximately in a hook shape.

Each of the first insulator teeth 124a further includes a first seating rib 133a protruding from the outer surface thereof, i.e., from the outer surfaces of the extension portion 131a and the width widening portion 132a to allow the insulation film 130 to be seated between and supported by neighboring ones of the first insulator teeth 124a, and at least one separation prevention protrusion 135a protruding from the first seating rib 133a toward the second insulator 120b to prevent the insulation film 130 seated at the first seating rib 133a from being separated from the first seating rib 133a. The first seating rib 133a includes a seating surface 137a formed along and on the outer surfaces of the extension portion 131a and the width widening portion 132a in a stepped manner. The separation prevention protrusion 135a is provided at both sides of the extension portion 131a.

The first insulator 120a includes a second seating rib 134a protruding inward from the inner circumferential surface of the first insulator body 122a positioned between neighboring ones of the first insulator teeth 124a in the radial direction of the first insulator body 122a and connected to the first seating rib 133a. The second seating rib 134a connects the first seating ribs 133a formed at neighboring ones of the first insulator teeth 124a.

The second insulator 120b includes a second core accommodation portion 121b to accommodate the other end 110b of the stator core 110. The second core accommodation portion 121b is formed in a shape corresponding to the external shape of the stator core 110 to accommodate the stator core 110.

Each of the second insulator teeth 124b includes an extension portion 131b extending from the inner circumferential surface of the second insulator body 122b toward the center of the second insulator body 122a, and a width widening portion 132b provided at one end of the extension portion 131b. The coil 140 is wound around the extension portion 131b. The width widening portion 132b includes at least one guide surface 136b to guide the insulation film 130 such that the end portion of the insulation film 130 is bent approximately in a hook shape.

Each of the second insulator teeth 124b further includes a third seating rib 133b protruding from the outer surface thereof, i.e., from the outer surfaces of the extension portion 131 b and the width widening portion 132b to allow the insulation film 130 to be seated between and supported by neighboring ones of the second insulator teeth 124b. The third seating rib 133b includes a seating surface 137b formed along and on the outer surfaces of the extension portion 131b and the width widening portion 132b in a stepped manner.

The second insulator 120b includes a fourth seating rib 134b protruding inward from the inner circumferential surface of the second insulator body 122b positioned between neighboring ones of the second insulator teeth 124b in the radial direction of the second insulator body 122b and connected to the third seating rib 133b. The fourth seating rib 134b connects the third seating ribs 133b formed at the neighboring ones of the third insulator teeth 124b.

The first seating rib 133a, second seating ribs 134a, third seating rib 133b and fourth seating rib 134b prevent the insulation film 130 from being separated in the axial direction of the stator 100. Accordingly, the first seating rib 133a, second seating ribs 134a, third seating rib 133b and fourth seating rib 134b may be considered as separation prevention ribs.

The separation prevention protrusion 135a prevents the insulation film 130 from being separated and moved to the space between neighboring ones of the first insulator teeth 124a or between neighboring ones of the second insulator teeth 124b. The separation prevention protrusion 135a may be provided only at the first insulator 120a, or only at the second insulator 120b, or at both of the first insulator 120a and the second insulator 120b.

The insulation film 130 includes a first part 130a seated at and supported by the second seating rib 134a and the fourth seating rib 134b, and a second part 130b seated at and supported by the first seating rib 133a and the third seating rib 133b. The second part 130b is bent from both ends of the first part 130a. The ends of the second part 130b are guided by the guide surfaces 136a and 136b to be bent approximately in a hook shape.

The insulation film 130 is formed to have a longer length than the height of the stator core 110 in the axial direction of the stator core 110. As shown in FIG. 12, when the insulation film 130 is coupled between the first insulator 120a and the second insulator 120b, both ends of the insulation film 130 protrude from both ends 110a and 110b of the stator core 110 in the axial direction of the stator core 110. Therefore, the stator core 110 and the coil 140 are stably insulated.

Since the thin insulation film 130 is inserted between the first insulator 120a and the second insulator 120b and between one of first insulator teeth 124a and a neighboring corresponding one of the second insulator teeth 124b to directly surround the lateral surfaces of the core teeth 114, the space for winding of the coil 140 may be widened, and the diameter of the winding of the coil 140 may be increased. Accordingly, large magnetic flux may be formed at the stator 100, and thereby performance of the motor 40 may be improved without increase of the size of the stator 100.

As is apparent from the above description, a motor according to an embodiment of the present disclosure allows increase in the winding area or diameter of a coil wound around a stator without increasing the size of the stator, and thereby the performance of the motor may be enhanced.

In addition, a motor according to another embodiment of the present disclosure may be stably fixed to a washing machine in an easy and correct way, and thereby durability and assemblability may be improved.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A washing machine comprising:
    a body;
    a tub disposed in the body;
    a drum rotatably disposed in the tub; and
    a motor including a stator coupled to a rear surface of the tub and a rotor rotatably disposed inside the stator,
    wherein the stator comprises
        a stator core including a core body and a plurality of core teeth extending inward from an inner circumferential surface of the core body in a radial direction of the core body;
        a first insulator and a second insulator covering both ends of the core body and the core teeth;
        a coil wound around the core teeth; and
        a plurality of insulation films disposed between the first insulator and the second insulator to electrically insulate the stator core and the coil,
    wherein the first insulator comprises a first insulator body covering one end of the core body, and a plurality of first insulator teeth covering one end of each of the core teeth,
    wherein the insulation films are inserted between neighboring ones of the first insulator teeth to directly surround lateral surfaces of the plurality of core teeth,
    wherein a length of the insulation films in an axial direction of the stator is longer than a length of the stator core, and
    wherein the each of the insulator teeth comprises at least one film guide surface to guide one end of each of the insulation films to be bent toward an inside of the insulator teeth.

2. The washing machine according to claim 1, wherein the first insulator comprises a first seating rib protruding outward from an outer surface of each of the first insulator teeth to allow a corresponding one of the insulation films to be seated.

3. The washing machine according to claim 2, wherein the first insulator further comprises at least one separation prevention protrusion protruding from the first seating rib toward the second insulator to prevent the corresponding one of the insulation films from being separated from the first seating rib.

4. The washing machine according to claim 2, wherein the first insulator further comprises a second seating rib protruding inward from an inner circumferential surface of the first insulator body positioned between neighboring ones of the first insulator teeth in a radial direction of the first insulator body, and connected to the first seating rib.

5. The washing machine according to claim 1, wherein:
the first insulator comprises at least one connection rib protruding from one end thereof facing the second insulator and connected to the second insulator; and
the second insulator comprises at least one fixing rib disposed at a position corresponding to a position of the connection rib and protruding from one end thereof facing the tub to contact the tub.

6. The washing machine according to claim 5, wherein:
the first insulator comprises a first through hole formed through the connection rib; and
the second insulator comprises a second through hole formed through the fixing rib and disposed concentric with the first through hole.

7. The washing machine according to claim 6, wherein the second insulator comprises at least one fixing pin protruding from the fixing rib toward the rear surface of the tub.

8. The washing machine according to claim 7, comprising a bearing housing inserted into the rear surface of the tub,
wherein the tub comprises a first accommodation hole to accommodate the fixing pin inserted thereinto,
wherein the bearing housing comprises a second accommodation hole to communicate with the second through hole when the fixing pin inserted into and accommodated in the first accommodation hole.

9. The washing machine according to claim 7, further comprising a bearing housing inserted into the rear surface of the tub, the bearing housing comprising:
a first accommodation hole to accommodate the fixing pin inserted thereinto; and
a second accommodation hole to communicate with the second through hole when the fixing pin inserted into and accommodated in the first accommodation hole.

10. A motor comprising a stator and a rotor rotatably disposed inside the stator, wherein the stator comprises:
a stator core including a core body and a plurality of core teeth extending inward from an inner circumferential surface of the core body in a radial direction of the core body;
an insulator comprising an insulator body covering both ends of the core body, and a plurality of insulator teeth covering both ends of the core teeth; and
a plurality of insulation films having a length in an axial direction of the stator that is longer than a length of the stator core, each of the plurality of insulation films being inserted between neighboring ones of the insulator teeth to directly surround lateral surfaces of each of the plurality of the core teeth,
wherein the insulator comprises a plurality of separation prevention ribs formed on outer surfaces of the insulator teeth in a stepped manner to prevent the insulation films from being separated from the insulator, and
wherein the each of the insulator teeth comprises at least one film guide surface to guide one end of each of the insulation films to be bent toward an inside of the insulator teeth.

11. The motor according to claim 10, wherein the insulator comprises at least one separation prevention protrusion protruding from the separation prevention rib to an inside of the insulator to prevent each of the insulation films from being separated from the insulator and moved to a space between neighboring ones of the insulator teeth.

12. The motor according to claim 11, wherein each of the insulator teeth comprises:
an extension portion extending from an inner circumferential surface of the insulator body toward a center of the insulator body; and
a width widening portion provided at one end of the extension portion.

13. The motor according to claim 12, wherein the extension portion is disposed between the separation prevention protrusions.

14. The motor according to claim 12, wherein the width widening portion comprises the at least one film guide surface to guide one end of each of the insulation films to be bent toward an inside thereof.

15. The motor according to claim 14, wherein the at least one guide surface is configured to guide the insulation film such that the end of the insulation film is bent approximately in a hook shape.

* * * * *